US009357122B2

(12) United States Patent
Kususaki et al.

(10) Patent No.: US 9,357,122 B2
(45) Date of Patent: May 31, 2016

(54) PHOTOELECTRIC CONVERSION APPARATUS, FOCUS DETECTING APPARATUS, IMAGING SYSTEM, AND DRIVING METHOD OF PHOTOELECTRIC CONVERSION APPARATUS

(71) Applicant: CANON KABUSHIKI KAISHA, Tokyo (JP)

(72) Inventors: Tomoki Kususaki, Kawasaki (JP); Yukihiro Kuroda, Inagi (JP); Hideo Kobayashi, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 63 days.

(21) Appl. No.: 14/325,874

(22) Filed: Jul. 8, 2014

(65) Prior Publication Data

US 2015/0042857 A1 Feb. 12, 2015

(30) Foreign Application Priority Data

Aug. 12, 2013 (JP) ................................ 2013-167683

(51) Int. Cl.

*H01L 31/00* (2006.01)
*H04N 5/232* (2006.01)
*G03B 13/36* (2006.01)
*H04N 5/369* (2011.01)
*G02B 7/34* (2006.01)

(52) U.S. Cl.

CPC ............ *H04N 5/23212* (2013.01); *G02B 7/346* (2013.01); *G03B 13/36* (2013.01); *H04N 5/3696* (2013.01)

(58) Field of Classification Search

CPC ............. H04N 5/3535; H04N 5/23212; H01L 27/14647

USPC .................................... 250/226, 208.1, 214.1

See application file for complete search history.

(56) References Cited

U.S. PATENT DOCUMENTS 7,709,869 B2 5/2010 Kuroda
7,911,521 B2 3/2011 Kuroda et al.
7,935,995 B2 5/2011 Watanabe et al.
7,990,440 B2 8/2011 Kobayashi et al.
8,174,599 B2 5/2012 Kuroda et al.
8,222,682 B2 7/2012 Watanabe et al.
8,223,238 B2 7/2012 Kuroda et al.
8,345,137 B2 1/2013 Shinohara et al.
8,390,713 B2 3/2013 Kuroda et al.
8,471,937 B2 6/2013 Saito et al.
8,670,058 B2 3/2014 Hayashi et al.

(Continued)

FOREIGN PATENT DOCUMENTS

JP 2004-309701 A 11/2004
JP 2012-48064 A 3/2012

*Primary Examiner* — Thanh Luu

(74) *Attorney, Agent, or Firm* — Fitzpatrick, Cella, Harper & Scinto

(57) ABSTRACT

A photoelectric conversion apparatus is a photoelectric conversion apparatus formed in a semiconductor substrate, and includes: a first photoelectric conversion unit (31) formed as a first conductivity type; a second photoelectric conversion unit (32) formed as a second conductivity type at a position deeper, in a depth direction of the semiconductor substrate, rather than the first photoelectric conversion unit; and a monitor unit configured to monitor a signal of the second photoelectric conversion unit, during a charge accumulation period of the first photoelectric conversion unit.

13 Claims, 11 Drawing Sheets

(56) References Cited

U.S. PATENT DOCUMENTS 8,710,558 B2 4/2014 Inoue et al.
8,835,828 B2 9/2014 Kobayashi
2009/0032678 A1* 2/2009 Taniguchi ......... H01L 27/14645 250/201.2
2012/0050584 A1* 3/2012 Saito et al. ........... H04N 5/3692 348/241
2012/0273657 A1 11/2012 Kobayashi
2013/0063635 A1 3/2013 Kobayashi
2013/0082343 A1 4/2013 Fudaba et al.
2013/0140440 A1 6/2013 Kobayashi
2013/0140608 A1 6/2013 Kuroda et al.
2013/0313622 A1 11/2013 Kuroda
2014/0253637 A1 9/2014 Newton et al.

* cited by examiner 12
21
21
211
212
PHOTOELECTRIC CONVERSION UNIT
AmpA
AmpM
AmpB
23
MONITOR UNIT
BufA
BufB
SIGNAL HOLDING UNIT
22

12
21
21
211
212
PHOTOELECTRIC CONVERSION UNIT
AmpA
AmpM
AmpB
SIGNAL HOLDING UNIT
22
MONITOR UNIT
23
SWITCHING UNIT
61
BufA 12
21
21
211
212
PHOTOELECTRIC CONVERSION UNIT
AmpA
AmpM
23
MONITOR UNIT
BufA
SIGNAL HOLDING UNIT
22

12
21
21
211
212
23
91
22
PHOTOELECTRIC CONVERSION UNIT
AmpA
AmpM
AmpB
MONITOR UNIT
AMPLIFIER CONTROLLING UNIT
SIGNAL HOLDING UNIT
BufA
BufB

101
ACCUMULATION PERIOD CONTROLLING UNIT
23
MONITOR UNIT
BufA
BufB
12
21
21
PHOTOELECTRIC CONVERSION UNIT
211
212
AmpA
AmpM
AmpB
SIGNAL HOLDING UNIT
22

901
902
903
904
905
906
907
908
909
910
911
912
913
914
915

PHOTOELECTRIC CONVERSION APPARATUS, FOCUS DETECTING APPARATUS, IMAGING SYSTEM, AND DRIVING METHOD OF PHOTOELECTRIC CONVERSION APPARATUS

BACKGROUND OF THE INVENTION

1. Field of the Invention

The present invention relates to a photoelectric conversion apparatus, a focus detecting apparatus, an imaging system, and a driving method of a photoelectric conversion apparatus.

2. Description of the Related Art

A photoelectric conversion apparatus is known as a photoelectric conversion apparatus for phase difference detection type auto focusing, which is provided with a photoelectric conversion unit for detecting positional information on an object, and a photoelectric conversion unit for a monitor for monitoring a charge accumulation quantity of the photoelectric conversion unit in order to control an accumulation period of the photoelectric conversion unit. In FIG. 5 of Japanese Patent Application Laid-Open No. 2012-48064, a configuration is disclosed in which these two photoelectric conversion units are arranged side by side on a flat surface.

SUMMARY OF THE INVENTION

According to an aspect of the present invention, a photoelectric conversion apparatus formed in a semiconductor substrate comprises: a first photoelectric conversion unit formed as a first conductivity type; a second photoelectric conversion unit formed as a second conductivity type at a position deeper, in a depth direction of the substrate, rather than the first photoelectric conversion unit; and a monitor unit configured to monitor a signal of the second photoelectric conversion unit, during a charge accumulation period of the first photoelectric conversion unit.

Further features of the present invention will become apparent from the following description of exemplary embodiments with reference to the attached drawings.

DESCRIPTION OF THE EMBODIMENTS

Preferred embodiments of the present invention will now be described in detail in accordance with the accompanying drawings.

In the configuration in Japanese Patent Application Laid-Open No. 2012-48064, positions of a photoelectric conversion unit for detecting positional information on an object and a photoelectric conversion unit for a monitor are different from each other on a flat surface. Because of this, under such a condition that the photoelectric conversion unit for the monitor is irradiated with light which is different from light of the positional information on the object, an output difference occurs between these two photoelectric conversion units, and exerts a detrimental effect on the control of an accumulation period.

The following description relates to a photoelectric conversion apparatus which can reduce a difference between output levels of a plurality of photoelectric conversion units, a focus detecting apparatus, an imaging system, and a driving method of the photoelectric conversion apparatus.

First Embodiment

Figure 1:
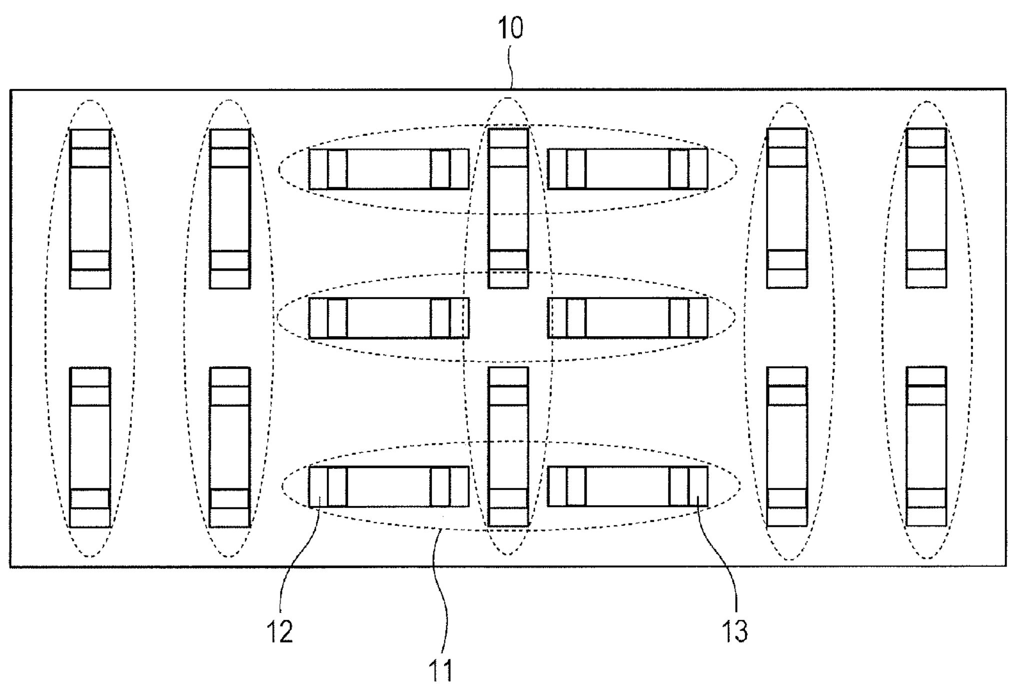
FIG. 1 is a layout chart illustrating an arrangement of a line sensor of a photoelectric conversion apparatus.

FIG. 1 is a view illustrating a focus detecting apparatus according to a first embodiment of the present invention; and is a layout chart illustrating an arrangement example of line sensors in a photoelectric conversion apparatus for phase difference detection type auto focusing (Auto Focusing; hereinafter referred to as AF). The photoelectric conversion apparatus 10 has a plurality of line sensor pairs 11. The line sensor pair 11 has a standard line sensor 12 and a reference line sensor 13. The light which becomes positional information irradiates the standard line sensor 12 and the reference line sensor 13. The output signals from these two line sensors 12 and 13 are compared with each other, thereby a focus is detected by phase difference detection, and a defocus amount is determined. The focus detecting apparatus has the plurality of line sensors 12 and 13.

Figure 2:
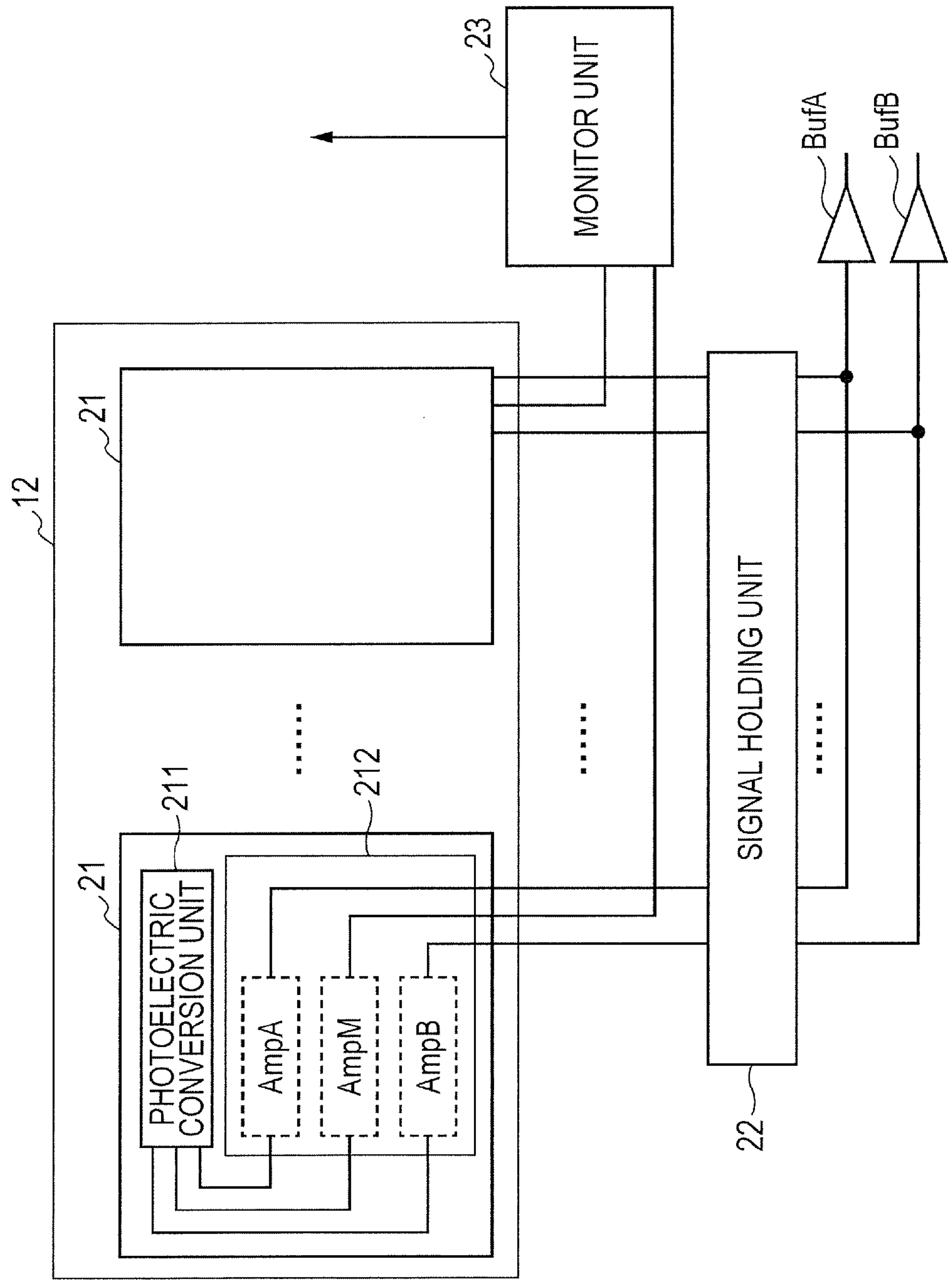
FIG. 2 is a view illustrating a configuration example of the line sensor according to a first embodiment.

FIG. 2 is a view illustrating a configuration example of the standard line sensor 12. The standard line sensor 12 has a plurality of unit pixels 21, and is connected to a signal holding unit 22 and a monitor unit 23. The unit pixel 21 has a photoelectric conversion unit 211 and a signal output unit 212. The signal output unit 212 has an amplifier AmpA, an amplifier AmpM and an amplifier AmpB. The amplifier is, for instance, a buffer amplifier. The photoelectric conversion unit 211 generates signals due to photoelectric conversion, and outputs the signals to the amplifiers AmpA, AmpM and AmpB, respectively. The amplifier AmpM in each of the unit pixels 21 amplifies the signal and outputs the amplified signal to the monitor unit 23, but may include a noise removing circuit so as to enhance the accuracy of signal detection. The amplifiers AmpA and AmpB in each of the unit pixels 21 amplify the respective signals. The output signals from the amplifiers AmpA and AmpB in each of the unit pixels 21 are each temporarily held in the signal holding unit 22, and are sequentially transmitted to output buffers BufA and BufB by a not-shown scanning circuit, respectively. The output buffers BufA and BufB buffer the respective signals. The output signal from the amplifier AmpM in each of the unit pixels 21 is used for detecting light quantity which the photoelectric conversion unit 211 receives, in real time. The monitor unit 23 outputs a signal based on a differential signal P-B between the maximum value P and the minimum value B out of the output signals from the amplifiers AmpM in the plurality of pixels. The reference line sensor 13 is similar to the standard line sensor 12, and accordingly the description will be omitted.

Figure 3:
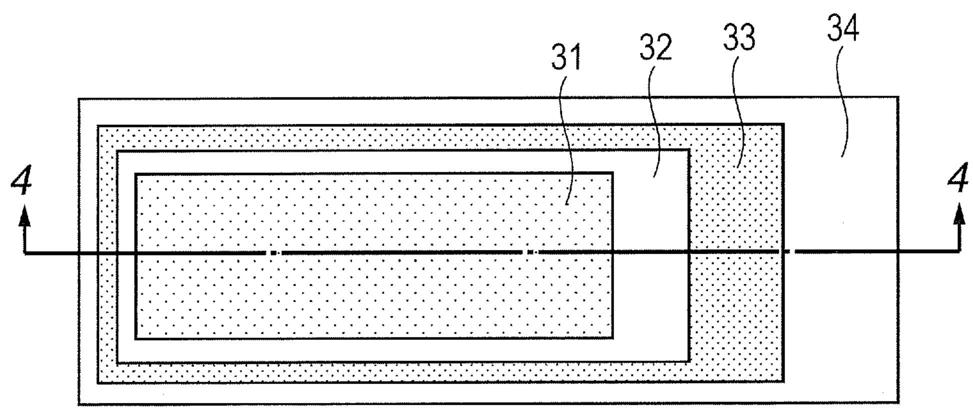
FIG. 3 is a plan view of photodiodes according to the first embodiment.

FIG. 3 is a plan view of photodiodes contained in the photoelectric conversion unit 211. A substrate 34 of a second conductivity type of semiconductor is shown. A first photoelectric conversion unit 31 is shown which is formed by a region of a first conductivity type of semiconductor. A second photoelectric conversion unit 32 is shown which is formed by a region of a second conductivity type of semiconductor. A third photoelectric conversion unit 33 is shown which is formed by a region of a first conductivity type of semiconductor. The area of the second conductivity type semiconductor region 32 is larger than the area of the first conductivity type semiconductor region 31. The photoelectric conversion apparatuses are formed on the semiconductor substrate 34.

Figure 4:
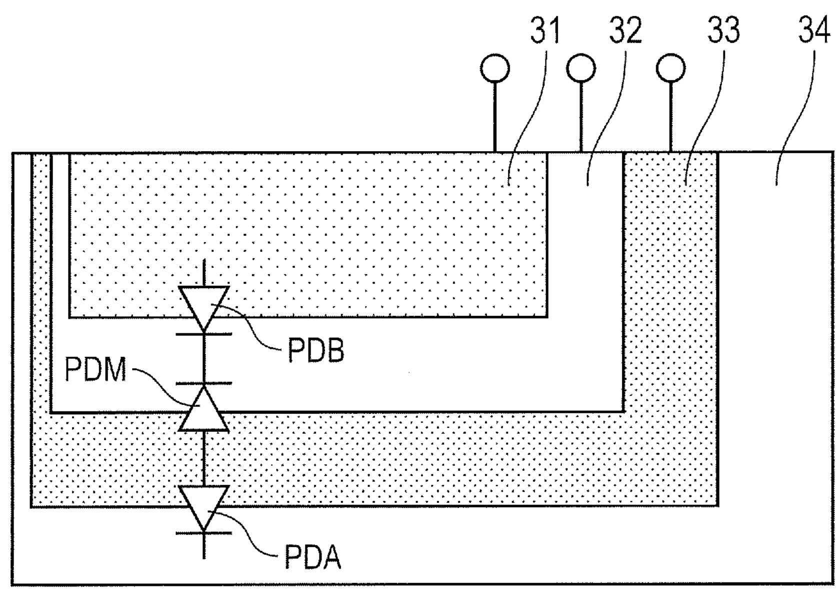
FIG. 4 is a sectional view of the photodiodes according to the first embodiment.

FIG. 4 is a sectional view of the photodiodes in FIG. 3 taken along the line 4-4. The second conductivity type semiconductor region 32 is formed at a deeper position than that of the first conductivity type semiconductor region 31, in a depth direction of the semiconductor substrate. The first conductivity type semiconductor region 33 is formed at a deeper position than that the second conductivity type semiconductor region 32, in the depth direction of the semiconductor substrate. A photodiode which is formed by the first conductivity type semiconductor region 31 and the second conductivity type semiconductor region 32 is designated by PDB. Similarly, a photodiode which is formed by the second conductivity type semiconductor region 32 and the first conductivity type semiconductor region 33 is designated by PDM, and a photodiode which is formed by the first conductivity type semiconductor region 33 and the second conductivity type semiconductor region 34 is designated by PDA. This configuration enables the light incident on a position corresponding to the light of the positional information on the object, which irradiates the first conductivity type semiconductor region 31, to be received also by the semiconductor regions 32 and 33. The following description will be described on the assumption that the first conductivity type semiconductor region is a p-type and the second conductivity type semiconductor region is an n-type, but the effect does not theoretically depend on the conductivity type, and accordingly even when the first conductivity type semiconductor region is determined to be the n-type and the second conductivity type semiconductor region is determined to be the p-type, the effect does not change. In addition, the following description will be described on the assumption that the photoelectric conversion unit has a three-layer structure of the semiconductor regions 31, 32 and 33, but the structure is not limited to the three-layer structure. It is acceptable to further form a second conductivity type semiconductor region at a deeper position than that of the first conductivity type semiconductor region 33, and further form a first conductivity type semiconductor region at a deeper position than that of the above second conductivity type semiconductor region. Thereby, the photoelectric conversion unit can have a structure of three or more layers, in which a fourth photoelectric conversion unit and a fifth photoelectric conversion unit are formed at deeper positions than that of the photodiode PDA. On the contrary, the photoelectric conversion unit may have a structure of two layers formed of the photodiode PDM and the photodiode PDA or PDB.

Figure 5:
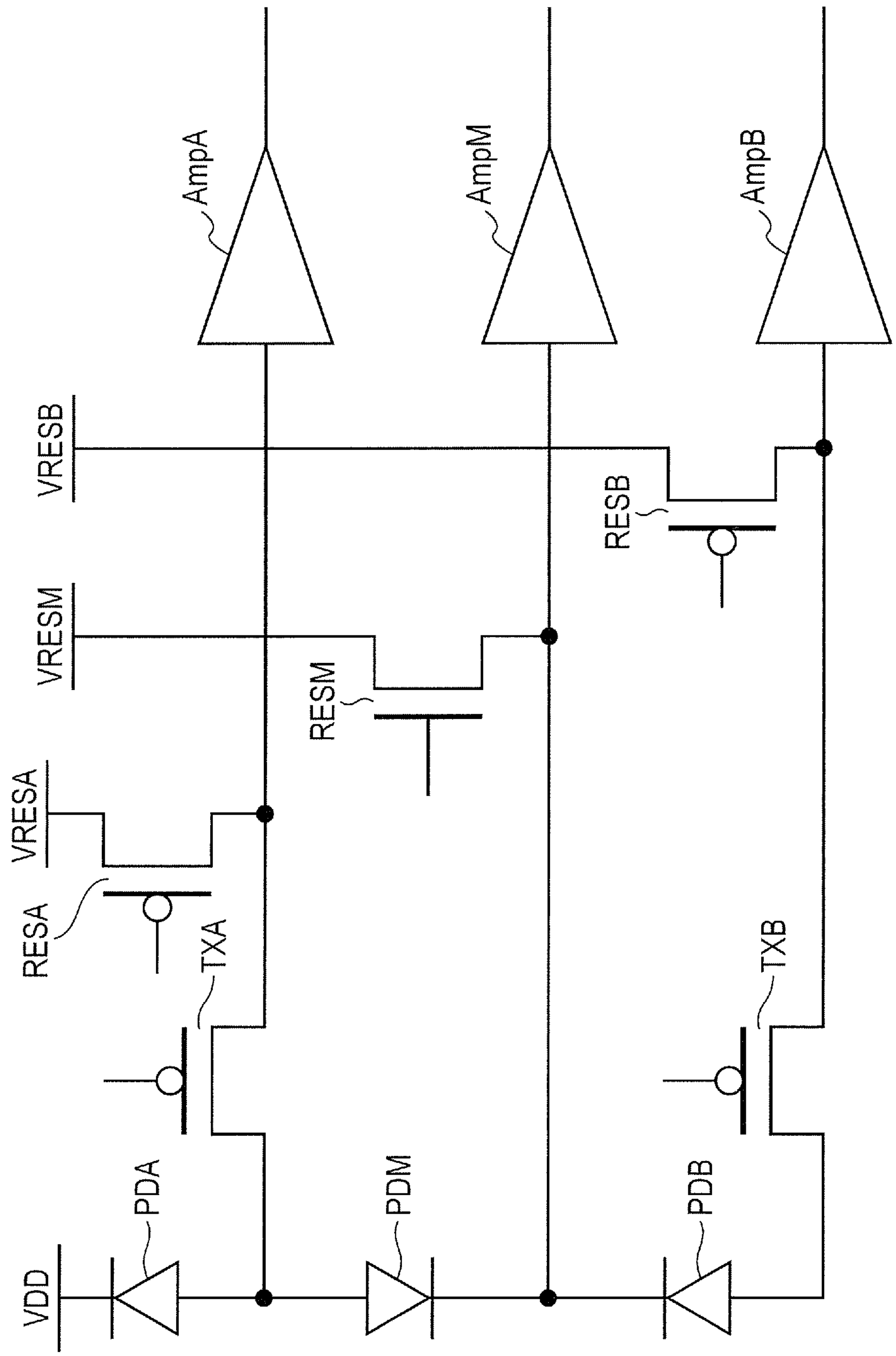
FIG. 5 is an equivalent circuit diagram of a unit pixel according to the first embodiment.

FIG. 5 is an equivalent circuit diagram of a unit pixel 21, and the same component members as those in FIG. 2 and FIG. 4 are designated by the same reference numerals. The photodiodes PDA, PDB and PDM convert light into an electric charge. In FIG. 4, the first conductivity type semiconductor region 31 is an output node of the photodiode PDB. The second conductivity type semiconductor region 32 is an output node of the photodiode PDM. The first conductivity type semiconductor region 33 is an output node of the photodiode PDA. Transistors TXA and TXB are transfer transistors for transferring electric charges which have been accumulated in the photodiodes PDA and PDB, respectively. Transistors RESA, RESM and RESB are reset transistors for resetting the photodiodes PDA, PDM and PDB to an initial state, respectively. Voltages VRESA, VRESM and VRESB are resetting power source voltages for the photodiodes PDA, PDM and PDB, respectively. The photodiodes PDA and PDB are photodiodes for detecting positional information. The photodiode PDM is a photodiode for a monitor for estimating the charge accumulation quantity in the photodiodes PDA and PDB. An anode of the photodiode PDA is connected to an input node of the amplifier AmpA through the transfer transistor TXA. A cathode of the photodiode PDM is connected directly to an input node of the amplifier AmpM, without passing through the transfer transistor. Thereby, an output node of the amplifier AmpM always outputs a signal according to a charge quantity which has been accumulated in the photodiode PDM, and the monitor unit 23 can monitor the light quantity which is received by the photoelectric conversion unit 211, in real time. The photodiode PDB is connected to an input node of the amplifier AmpB through the transfer transistor TXB, similarly to the photodiode PDA. The monitor unit 23 monitors the signal of the photodiode PDM, during the charge accumulation period of the photodiodes PDA and PDB. When the transfer transistors TXA and TXB are turned off, the photodiodes PDA and PDB can accumulate electric charges.

The photodiodes PDA and PDB are connected to the amplifiers AmpA and AmpB through the transfer transistors TXA and TXB, respectively, and accordingly have high S/N, but cannot detect the accumulated charge quantity so long as the transfer transistors TXA and TXB do not perform a transfer operation. Then, a monitor photodiode PDM is needed for estimating the charge quantities which have been accumulated in the photodiodes PDA and PDB. In the configuration illustrated in FIG. 5 of Japanese Patent Application Laid-Open No. 2012-48064, positions of a photodiode for detecting a light of positional information on an object and a monitor photodiode are different from each other on a flat surface, and accordingly the monitor photodiode cannot receive light which is incident on the photodiode. The present embodiment is excellent compared to Japanese Patent Application Laid-Open No. 2012-48064 in the point that the monitor photodiode PDM can receive light at a position corresponding to light which is incident on the photodiodes PDA and PDB, as is clear from FIG. 4.

As has been described above, according to the present embodiment, the monitor unit 23 always monitors an output signal from the photodiode PDM which receives the same light as that incident on the photodiodes PDA and PDB. Thereby, the charge quantities which have been accumulated in the photodiodes PDA and PDB can be accurately estimated, though the transfer operation is not performed.

Second Embodiment

Figure 6:
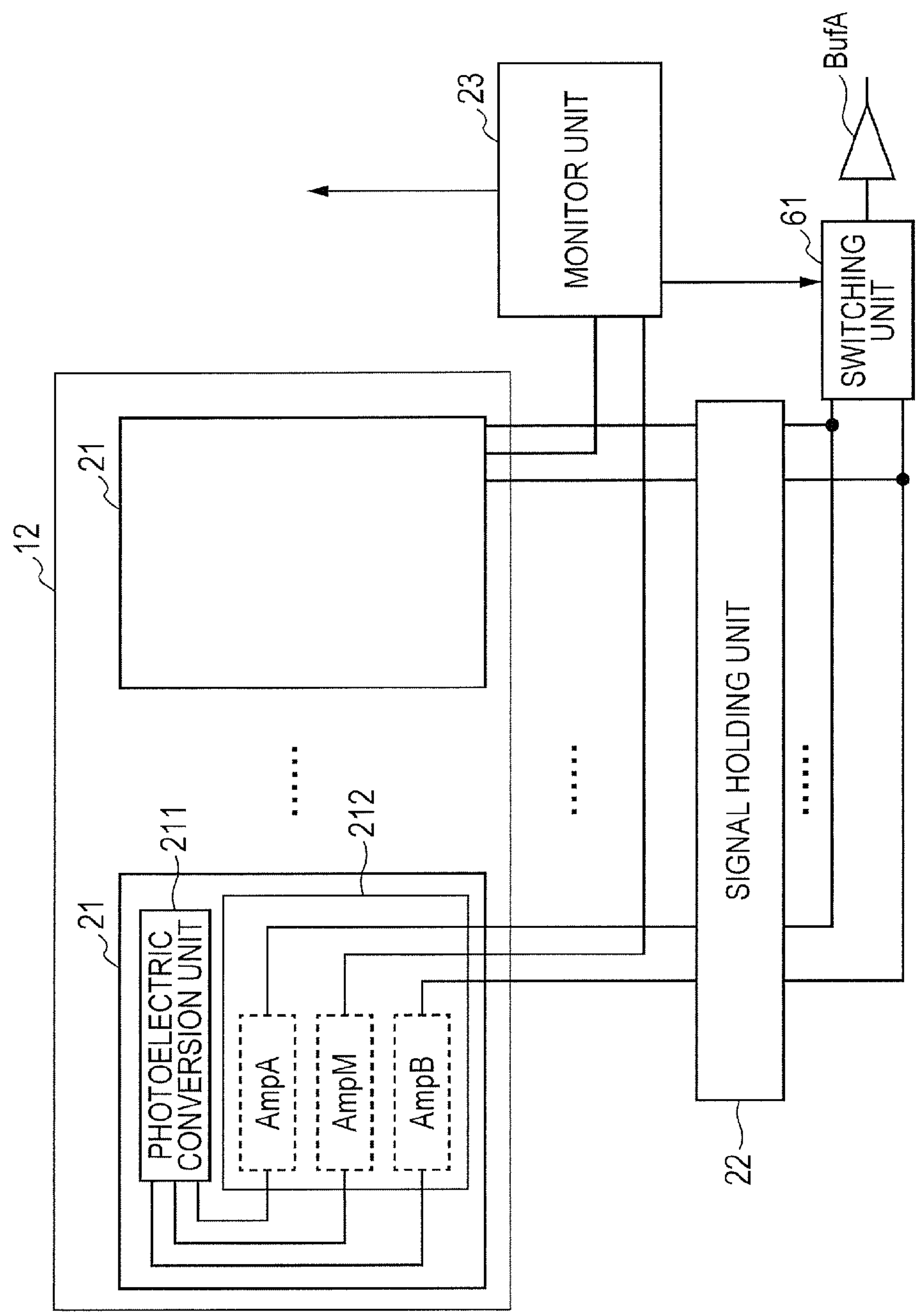
FIG. 6 is a view illustrating a configuration example of a line sensor according to a second embodiment.

FIG. 6 is a view illustrating a configuration example of the standard line sensor 12 and the reference line sensor 13 according to a second embodiment of the present invention. The same configurations as those in FIG. 2 are designated by the same reference numerals. A difference between the present embodiment and the first embodiment exists in a point that a switching unit (switching unit) 61 is connected between the signal holding unit 22 and the buffer BufA, and one buffer BufA is used as the buffer. The switching unit 61 is controlled by a signal which is output from the monitor unit 23. Suppose that the sensitivity of the photodiode PDB is higher than the sensitivity of the photodiode PDA. Under this environment, when surroundings are bright, the switching unit 61 connects a node to which the photodiode PDA having low sensitivity is connected, with the buffer BufA. In addition, when surroundings are dark, the switching unit 61 connects a node to which the photodiode PDB having high sensitivity is connected, with the buffer BufA. As has been described above, according to the present embodiment, the switching unit 61 outputs any one signal of the photodiodes PDA and PDB, and thereby can achieve a function of switching the sensitivity with one buffer BufA.

Third Embodiment

Figure 7:
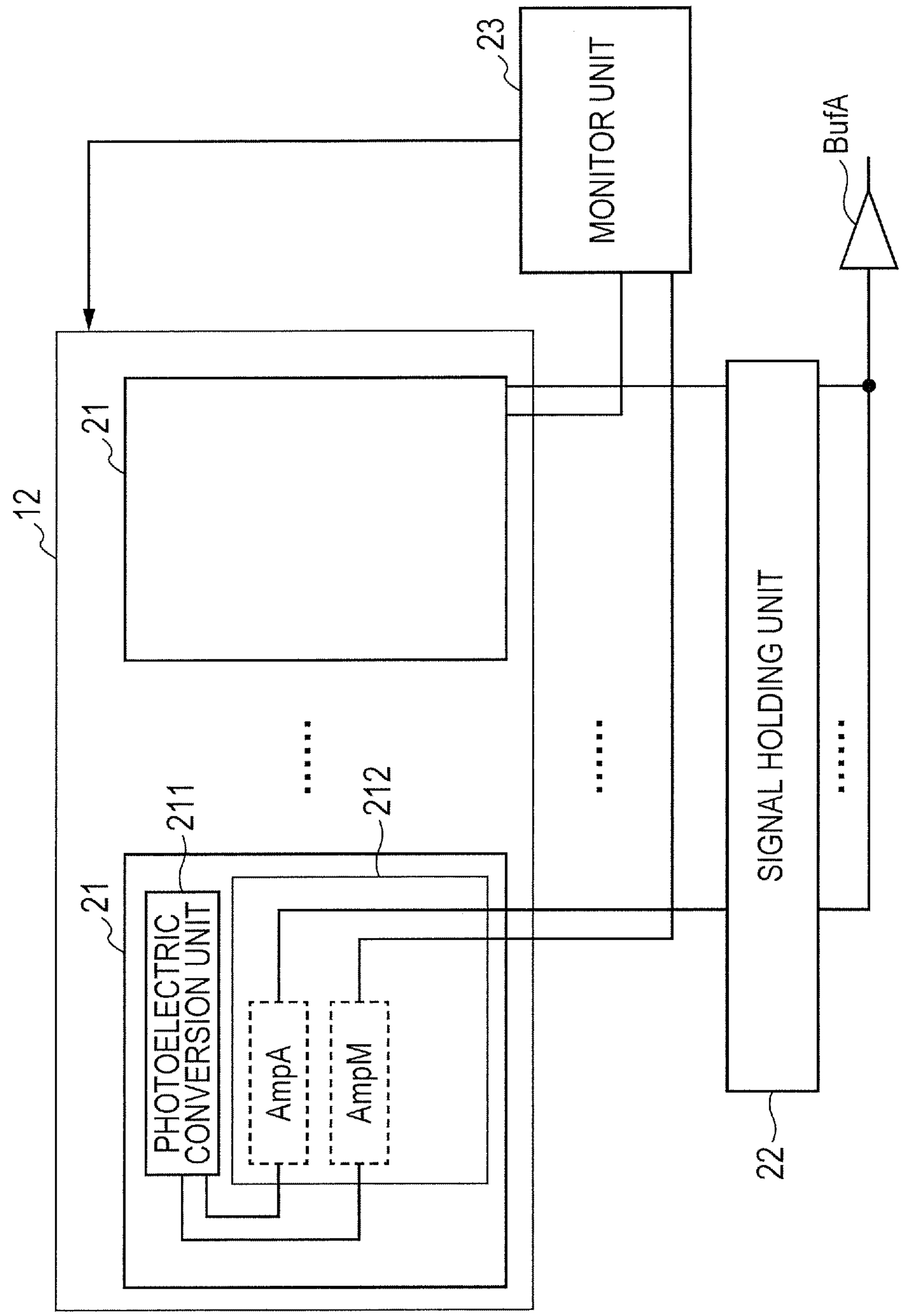
FIG. 7 is a view illustrating a configuration example of a line sensor according to a third embodiment.

FIG. 7 is a view illustrating a configuration example of the standard line sensor 12 and the reference line sensor 13 according to a third embodiment of the present invention. The same configurations as those in FIG. 2 are designated by the same reference numerals. A difference between the present embodiment and the first embodiment exists in a point that the amplifier AmpB and the buffer BufB in FIG. 2 are removed.

Figure 8:
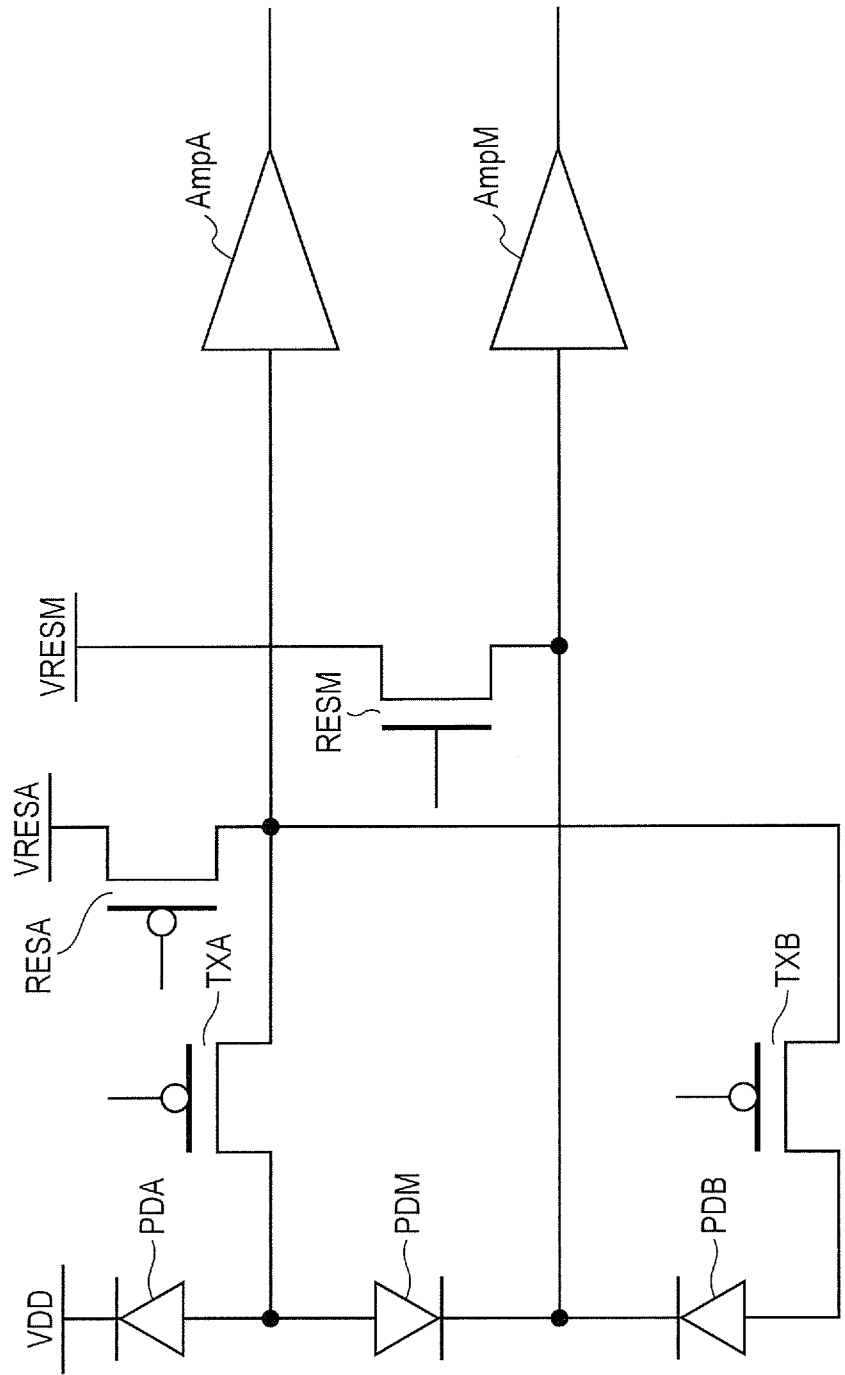
FIG. 8 is an equivalent circuit diagram of a unit pixel according to the third embodiment.

FIG. 8 is a view illustrating a configuration example of the unit pixel 21 in the present embodiment. The same configurations as those in FIG. 5 are designated by the same reference numerals. A difference between the present embodiment and the first embodiment exists in a point that the amplifier AmpB is removed, and the photodiode PDB is connected to an input node of the amplifier AmpA through the transfer transistor TXB. The transfer transistors TXA and TXB are controlled by a signal which is output from the monitor unit 23. According to this configuration, the transfer transistors TXA and TXB are connected to the same node, and accordingly function as an adding unit which can add an electric charge (signal) that has been generated in the photodiode PDA to an electric charge (signal) which has been generated in the photodiode PDB.

According to the present embodiment, an output of the photodiode PDA which is formed in a deep position and has high luminous sensitivity in a long wavelength can be added to an output of the photodiode PDB which is formed in a shallow position and has high luminous sensitivity in a short wavelength. Thereby, it is possible to reduce a difference of spectral characteristics between the photodiodes PDA and PDB for detecting positional information, and the photodiode PDM for estimating the charge accumulation quantity of the photodiodes PDA and PDB. In addition, a function of switching the sensitivity can be also used which uses the output of only the photodiodes PDA and PDB when the sensitivity is low, and uses the output obtained by adding the electric charges of both of the photodiodes PDA and PDB when the sensitivity is high.

Fourth Embodiment

Figure 9:
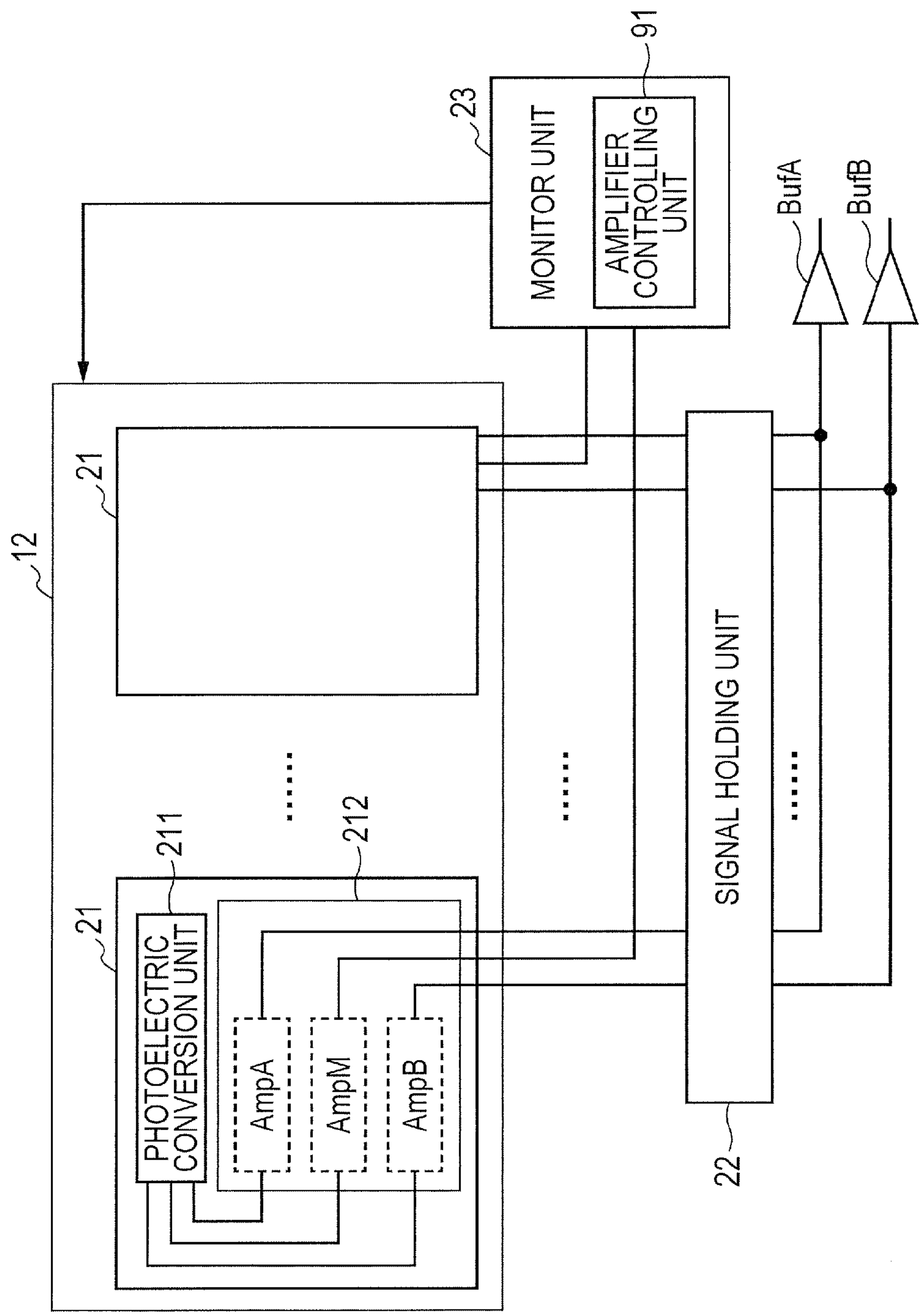
FIG. 9 is a view illustrating a configuration example of a line sensor according to a fourth embodiment.

FIG. 9 is a view illustrating a configuration example of the standard line sensor 12 and the reference line sensor 13 according to a fourth embodiment of the present invention. The same configurations as those in FIG. 2 are designated by the same reference numerals. A difference between the present embodiment and the first embodiment exists in a point that an amplifier controlling unit 91 is provided in the monitor unit 23. When the amplifier controlling unit 91 has determined that the amplitude of the differential signal P-B is small, the amplifier controlling unit 91 searches for an amplification factor necessary for sufficiently increasing the amplitude, and amplifies the input signal of the buffers BufA and BufB, at the above described amplification factor by a not-shown amplifier. The signal which has been amplified is input to the buffers BufA and BufB. According to the present embodiment, the amplifier controlling unit 91 controls the amplification factor of the output signals from the photodiodes PDA and PDB, based on the output signal from the photodiode PDM. Thereby, even when the amplitude of the differential signal P-B is small, if the signal is amplified at an appropriate amplification factor, a sufficiently large signal amplitude can be obtained.

Fifth Embodiment

Figure 10:
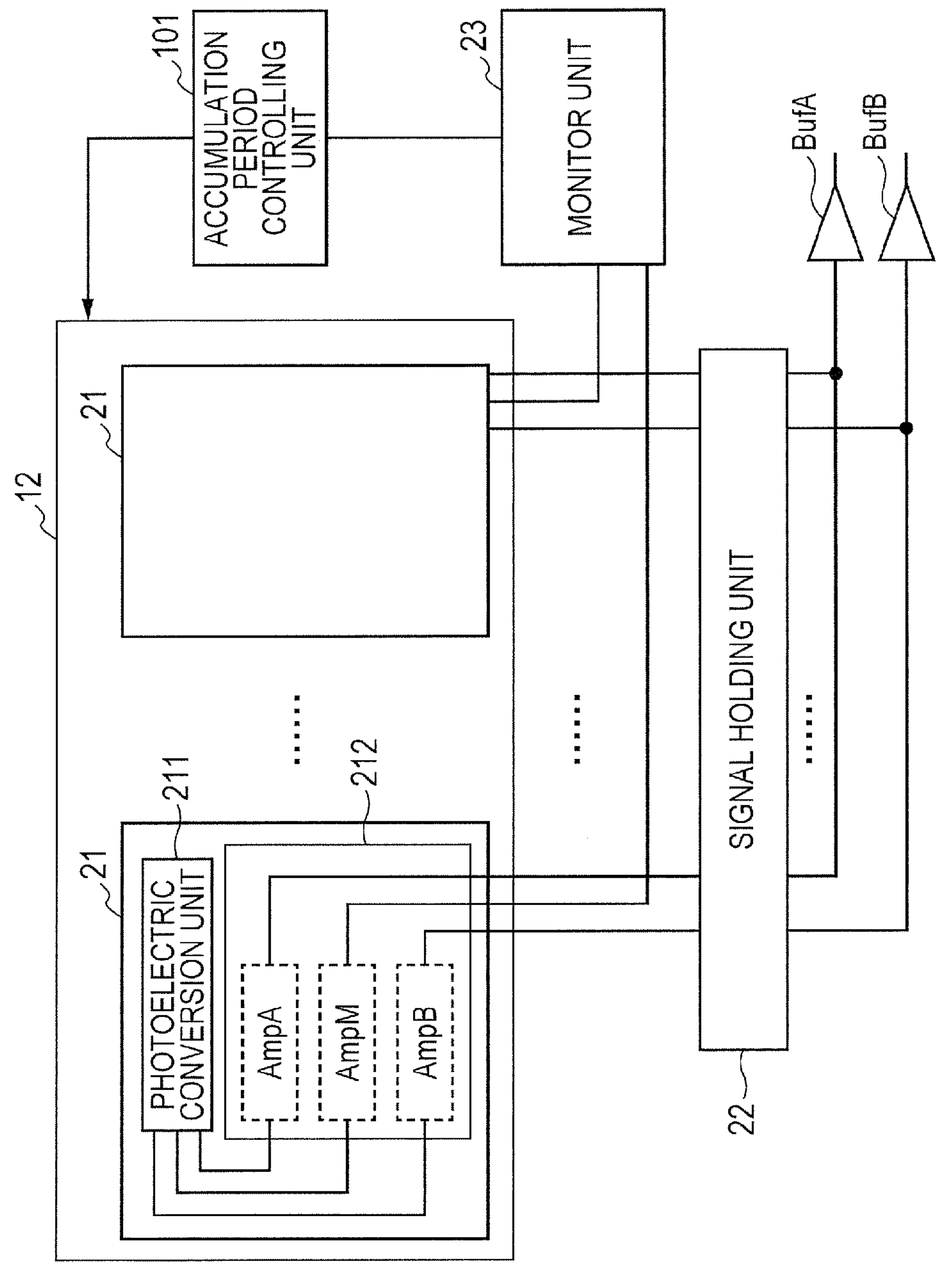
FIG. 10 is a view illustrating a configuration example of a line sensor according to a fifth embodiment.

FIG. 10 is a view illustrating a configuration example of the standard line sensor 12 and the reference line sensor 13 according to a fifth embodiment of the present invention. The same configurations as those in FIG. 2 are designated by the same reference numerals. A difference between the present embodiment and the first embodiment exists in a point that an accumulation period controlling unit 101 is provided between the monitor unit 23 and the unit pixel 21. A driving method of the standard line sensor 12 and the reference line sensor 13 will be described below. When the monitor unit 23 has determined that the amplitude of the differential signal P-B has exceeded a predetermined threshold, the monitor unit 23 outputs a signal for instructing the accumulation period controlling unit 101 to end the accumulation. The accumulation period controlling unit 101 which has received the signal controls the transfer transistors TXA and TXB that are contained in each of the unit pixels 21, and reads out electric charges which have been accumulated in the photodiodes PDA and PDB. According to the present embodiment, the accumulation period controlling unit 101 controls a length of the charge accumulation period of the photodiodes PDA and PDB based on the output signal from the photodiode PDM, and thereby can obtain the signal amplitude having a desired magnitude. In other words, according to a signal based on one photodiode PDM out of the plurality of photodiodes PDM, PDA and PDB, the accumulation period controlling unit 101 controls the charge accumulation period of the other photodiodes PDA and PDB.

Sixth Embodiment

Figure 11:
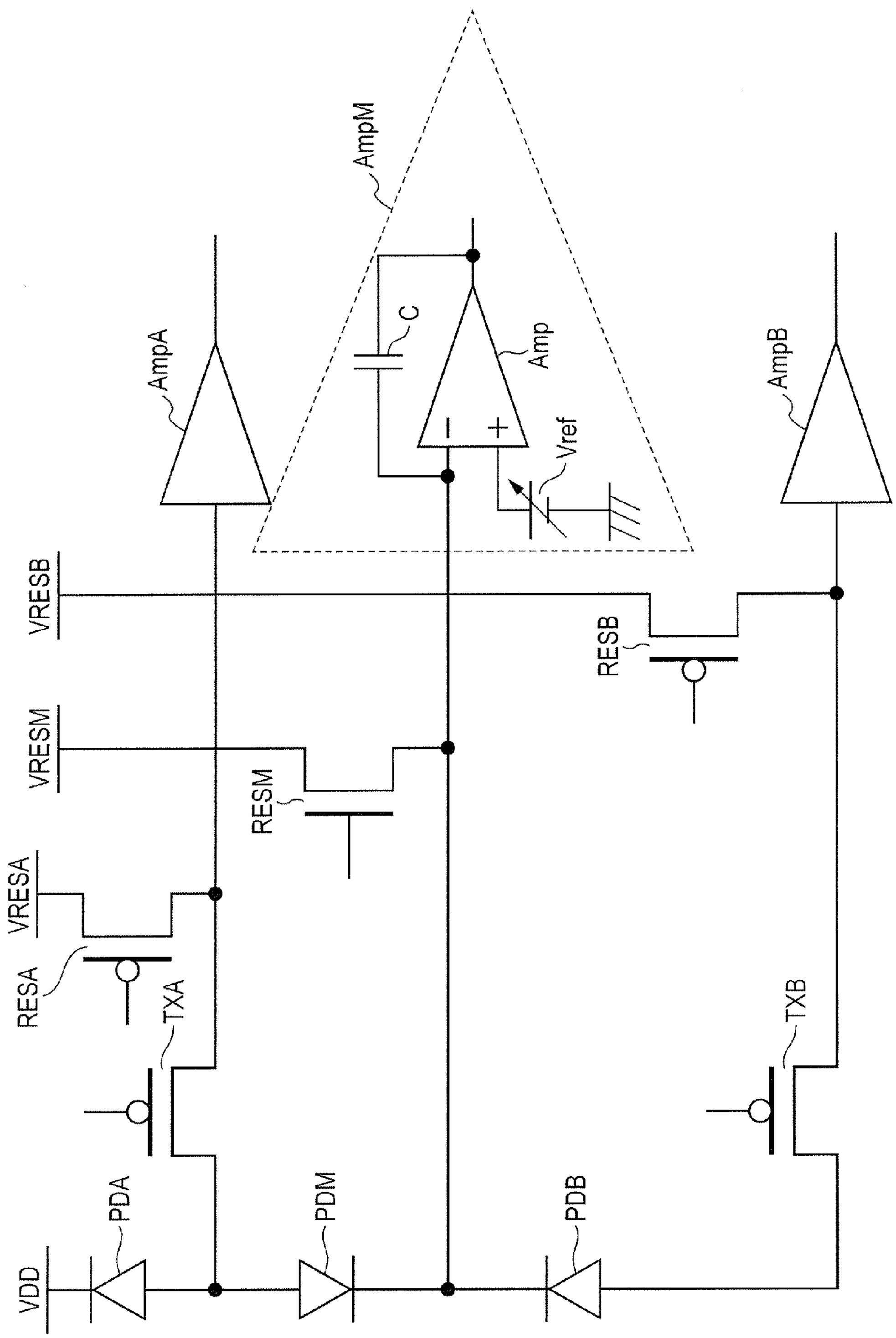
FIG. 11 is an equivalent circuit diagram of a unit pixel according to a sixth embodiment.

FIG. 11 is a view illustrating a configuration example of the unit pixel 21 according to a sixth embodiment of the present invention. The same configurations as those in FIG. 5 are designated by the same reference numerals. A difference between the present embodiment and the first embodiment exists in a point that the amplifier AmpM is formed of a current integration type amplifier, and has a capacitor C, an amplifier Amp and a reference supply Vref. The capacitor C is a capacitor for integrating a photo-electric current. The amplifier Amp is a differential amplifier. The Vref is a reference supply. According to this configuration, the amplifier AmpM outputs a signal based on a value obtained by the integration of the photo-electric current. In addition, the virtual ground enables the second conductivity type semiconductor region 32 to be kept at a fixed potential Vref. When the second conductivity type semiconductor region 32 is kept at the fixed potential, a change in the width of a depletion layer due to the fluctuation of an energy potential in a semiconductor can be suppressed. Because the photodiodes have different luminous sensitivities in every wavelength according to the depth, when the width of the depletion layer changes in the depth direction, the spectral characteristics result in being changed. According to the present embodiment, the amplifier AmpM fixes the potential of the second conductivity type semiconductor region 32, and outputs a signal obtained by time-integrating an electric current which is output from the photodiode PDM. Thereby, the amplifier AmpM can suppress the change in the width of the depletion layer, and can suppress the change in the spectral characteristics of the photodiode PDA and the photodiode PDB.

As has been described above, according to the first to sixth embodiments, positions of the photoelectric conversion units 31 and 33 for detecting positional information on the object and the photoelectric conversion unit 32 for a monitor approximately coincide with each other on a flat surface. For this reason, the photoelectric conversion unit for the monitor can monitor the light with high accuracy, which irradiates the photoelectric conversion units 31 and 33 for detecting the positional information on the object. Accordingly, a light-receiving positional correlation among the signals which are obtained from these photoelectric conversion units 31 to 33 can be enhanced, accordingly a difference among output levels of the photoelectric conversion units 31 to 33 can be reduced, and a controlling performance for the charge accumulation period can be enhanced.

Seventh Embodiment

Figure 12:
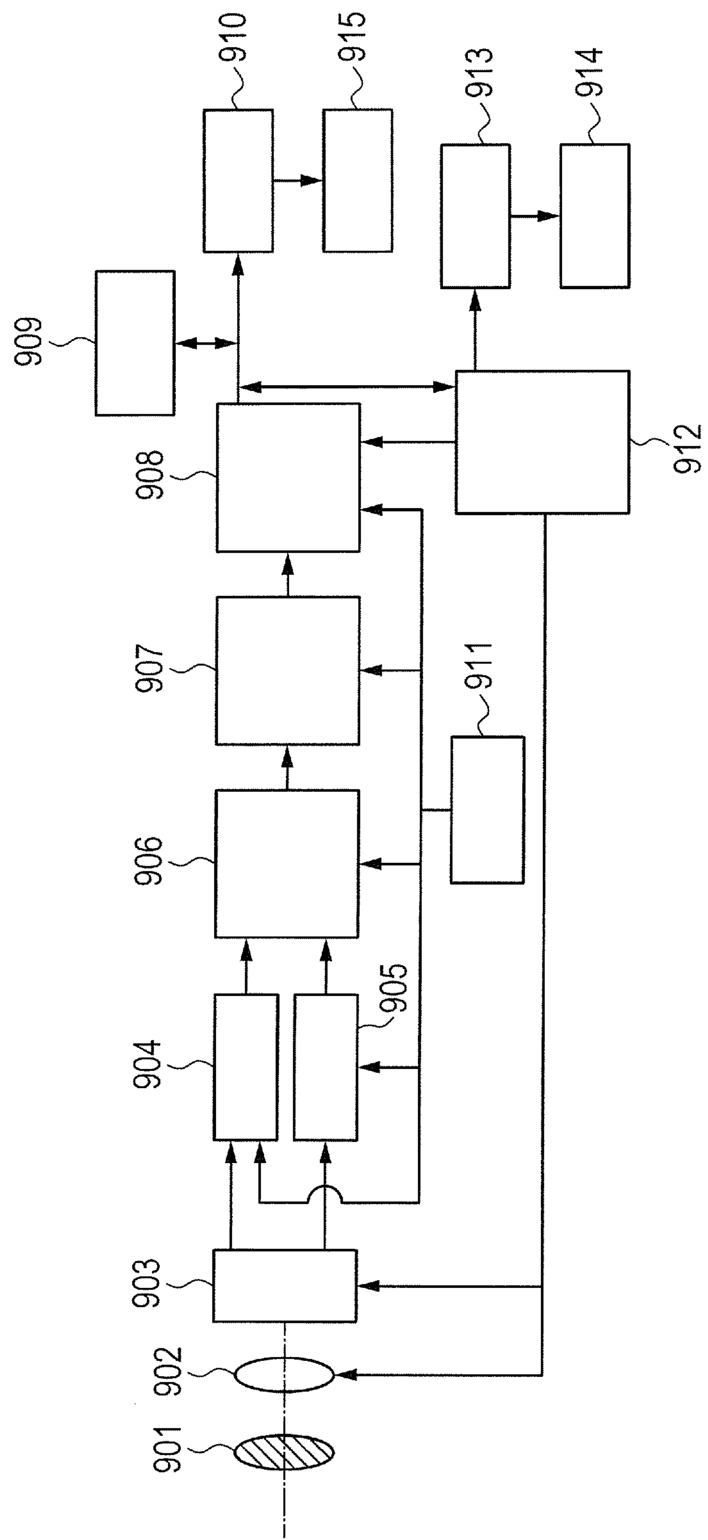
FIG. 12 is a view illustrating a configuration example of an imaging system according to a seventh embodiment.

FIG. 12 is a block diagram illustrating a configuration example of an imaging system according to a seventh embodiment of the present invention. A barrier 901 is shown which protects a lens that will be described later, a lens 902 is shown which forms an optical image of an object on a solid-state imaging apparatus 904, and a diaphragm 903 is shown which adjusts a quantity of light which has passed through the lens. The solid-state imaging apparatus 904 acquires the optical image of the object, which has been formed by the lens, as an image signal. An AF sensor 905 (focus detecting apparatus) is shown which uses the photoelectric conversion apparatus that has been described in each of the previously described embodiments.

An analog signal processing apparatus 906 is shown which processes the signal that is output from the solid-state imaging apparatus 904 and the AF sensor 905, and an A/D converter 907 is shown which converts the signal that has been output from the signal processing apparatus 906, from analog to digital form. A digital signal processing unit 908 is shown which subjects the image data that has been output from the A/D converter 907, to various correction operations, and compresses the data.

A memory unit 909 is shown which temporarily memorizes the image data, an external I/F circuit 910 is shown which communicates with an external computer and the like, and a timing generating unit 911 is shown which outputs various timing signals to the digital signal processing unit 908 and the like. An overall controlling/calculating unit 912 is shown which performs various calculations and controls the whole camera, a recording medium controlling I/F unit 913 is shown, a releasable recording medium 914 is shown which is a semiconductor memory or the like for recording or reading out the acquired image data, and an external computer 915 is shown.

Next, an operation at the time when the above described imaging system takes a photograph will be described. The barrier 901 is opened, and then the overall controlling/calculating unit 912 calculates a distance to the object by the phase difference detection as has been described above, based on the signal output from the AF sensor 905. After that, the overall controlling/calculating unit 912 drives the lens 902 based on a calculated result, determines again whether the object is focused or not, and when having determined that the object is not focused, performs the auto focusing control of driving the lens 902, again. Subsequently, after the focusing has been confirmed, the charge accumulation operation starts by the solid-state imaging apparatus 904. When the charge accumulation operation of the solid-state imaging apparatus 904 has ended, an image signal output from the solid-state imaging apparatus 904 is converted into a digital signal from an analog signal by the A/D converter 907, the digital signal passes through the digital signal processing unit 908, and is written in the memory unit 909 by the overall controlling/calculating unit 912. After that, the data accumulated in the memory unit 909 is recorded in a recording medium 914 through the recording medium controlling I/F unit 910, by the control of the overall controlling/calculating unit 912. Alternatively, the data may also pass through the external I/F unit 910 and be directly input in the computer 915 and the like.

Note that the above embodiments are merely examples how the present invention can be practiced, and the technical scope of the present invention should not be restrictedly interpreted by the embodiments. In other words, the present invention can be practiced in various ways without departing from the technical concept and main features of the invention.

According to the above described technology, the positions of the first and the second photoelectric conversion units are approximately coincide with each other on the flat surface, and accordingly the difference between output levels of the first and the second photoelectric conversion units can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2013-167683, filed Aug. 12, 2013, which is hereby incorporated by reference herein in its entirety.

What is claimed is:

1. A photoelectric conversion apparatus formed in a semiconductor substrate comprising:

- a first photoelectric conversion unit formed as a first conductivity type;
- a second photoelectric conversion unit formed as a second conductivity type at a position deeper, in a depth direction of the substrate, than the first photoelectric conversion unit;
- a third photoelectric conversion unit formed as the first conductivity type at a position deeper, in a depth direction of the substrate, than the second photoelectric conversion unit; and
- a monitor unit configured to monitor a signal of the second photoelectric conversion unit, during charge accumulation periods of the first and third photoelectric conversion units.

2. The photoelectric conversion apparatus according to claim 1, wherein the second photoelectric conversion unit has an area larger than an area of the first photoelectric conversion unit.

3. The photoelectric conversion apparatus according to claim 2, further comprising:

a switching unit configured to output a signal from any one of the first and third photoelectric conversion units.

4. The photoelectric conversion apparatus according to claim 2, further comprising:

an adding unit configured to add signals from the first and third photoelectric conversion units.

5. The photoelectric conversion apparatus according to claim 2, further comprising:

an amplifier controlling unit configured to control an amplification factor of output signals from the first and third photoelectric conversion units, based on an output signal from the second photoelectric conversion unit.

6. The photoelectric conversion apparatus according to claim 2, further comprising:

an charge accumulation period controlling unit configured to control lengths of charge accumulation periods of the first and third photoelectric conversion units, based on an output signal from the second photoelectric conversion unit.

7. The photoelectric conversion apparatus according to claim 1, further comprising:

a switching unit configured to output a signal from any one of the first and third photoelectric conversion units.

8. The photoelectric conversion apparatus according to claim 1, further comprising:

an adding unit configured to add signals from the first and third photoelectric conversion units.

9. The photoelectric conversion apparatus according to claim 1, further comprising:

an amplifier controlling unit configured to control an amplification factor of output signals from the first and third photoelectric conversion units, based on an output signal from the second photoelectric conversion unit.

10. The photoelectric conversion apparatus according to claim 1, further comprising:

an charge accumulation period controlling unit configured to control lengths of charge accumulation periods of the first and third photoelectric conversion units, based on an output signal from the second photoelectric conversion unit.

11. The photoelectric conversion apparatus according to claim 1, further comprising:

an amplifier configured to fix a voltage applied to the second photoelectric conversion unit, and to output a signal based on a time integration of a current outputted from the second photoelectric conversion unit.

12. A focus detecting apparatus comprising:

a plurality of photoelectric conversion apparatus formed in a semiconductor substrate, each of the plurality of photoelectric conversion apparatus including a first photoelectric conversion unit formed as a first conductivity type;

a second photoelectric conversion unit formed as a second conductivity type at a position deeper, in a depth direction of the substrate, than the first photoelectric conversion unit;

a third photoelectric conversion unit formed as the first conductivity type at a position deeper, in a depth direction of the substrate, than the second photoelectric conversion unit; and a monitor unit configured to monitor a signal of the second photoelectric conversion unit, during charge accumulation periods of the first and third photoelectric conversion units.

13. An imaging system comprising:

a focus detecting apparatus including a plurality of photoelectric conversion apparatus formed in a semiconductor substrate, each of the plurality of photoelectric conversion apparatus including a first photoelectric conversion unit formed as a first conductivity type;

a second photoelectric conversion unit formed as a second conductivity type at a position deeper, in a depth direction of the substrate, than the first photoelectric conversion unit;

a third photoelectric conversion unit formed as the first conductivity type at a position deeper, in a depth direction of the substrate, than the second photoelectric conversion unit;

a monitor unit configured to monitor a signal of the second photoelectric conversion unit, during charge accumulation periods of the first and third photoelectric conversion units; and a lens focusing an optical image, wherein the lens is driven according to an output signal from the focus detecting apparatus.

* * * * *